May 5, 1953     B. E. HOUSE     2,637,417
BRAKE
Filed Dec. 6, 1946     2 SHEETS—SHEET 2
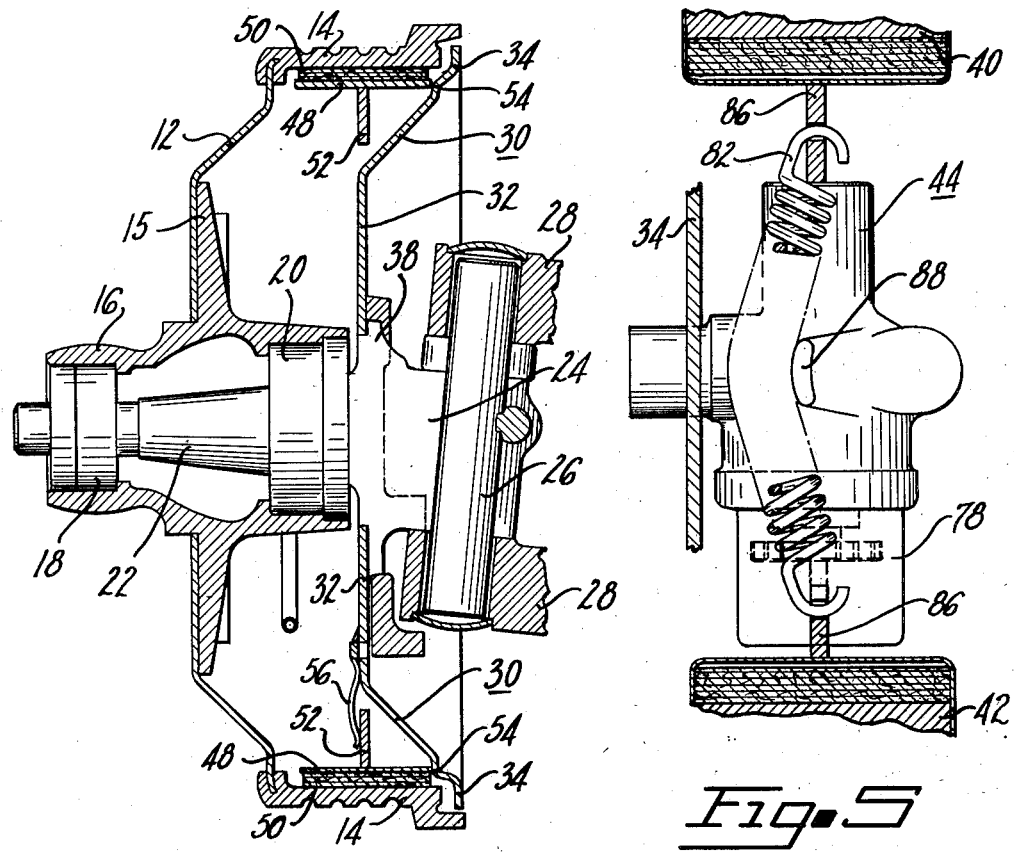
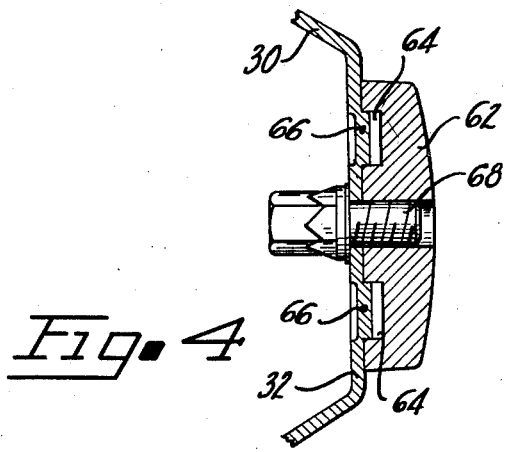
INVENTOR
BRYAN E. HOUSE
BY Patented May 5, 1953

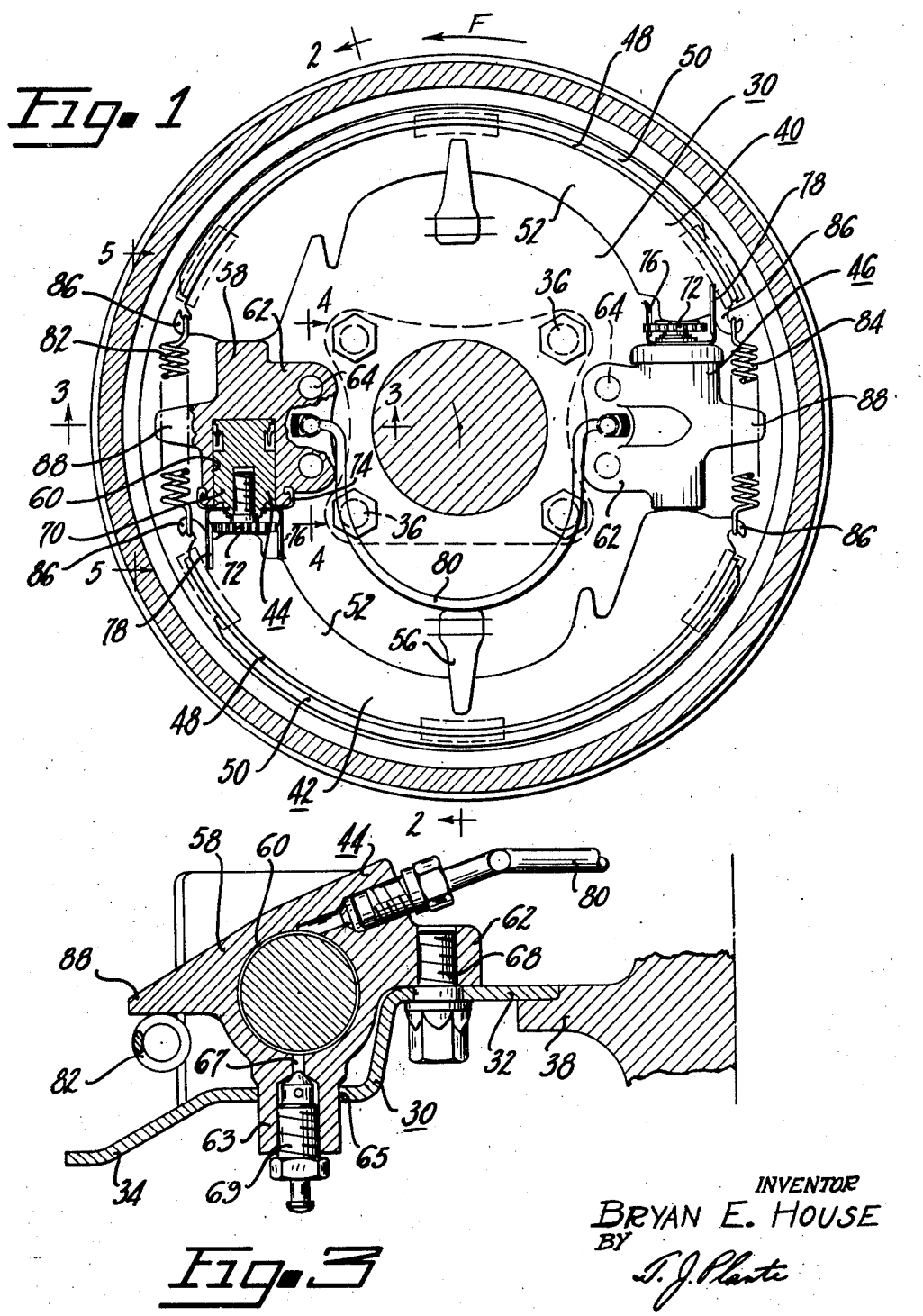

2,637,417

UNITED STATES PATENT OFFICE 2,637,417

BRAKE

Bryan E. House, South Bend, Ind., assignor to Bendix Aviation Corporation, South Bend, Ind., a corporation of Delaware Application December 6, 1946, Serial No. 714,468

22 Claims. (Cl. 188—152)

This invention relates to brakes of the internal-shoe-drum type, and is concerned primarily with the construction and arrangement of the supporting plate member which carries the applying and anchoring means of the brake.

In applications heretofore filed—including Goepfrich and House application Serial No. 531,384, filed April 17, 1944, now Patent No. 2,475,492, issued July 5, 1949, and House application Serial No. 661,702, filed April 12, 1946 (abandoned)—brake structures have been disclosed in which the anchoring and/or applying forces act in the same, or substantially the same, plane as the plane of the supporting plate, thereby avoiding offset loading and deflection of the supporting member. Each of the cited applications shows a brake arrangement which includes a supporting plate and a separate cover plate, the former serving as the torque-taking member, and the latter as the closure member for the open side of the brake drum.

It is an object of the present invention to provide a brake construction in which a single plate member serves both as a centrally-located support for the brake elements, and as a cover for the brake assembly. By "centrally-located support" is meant a supporting member which is not subjected to appreciable twisting or deflecting moments by the action of the applying and/or anchoring forces, the center lines, or axes, of the actuator, of the anchor, and of the shoe, all being in the same, or substantially the same, plane as the "supporting" portion of the plate member.

A further object of the present invention is to provide improved means for transmitting the shoe anchoring torque from the anchor member to the supporting plate. Inasmuch as hydraulic actuators may serve the dual function of applying and anchoring the shoes, the improved torque-transferring means is illustrated as a novel arrangement for mounting a hydraulic actuator on the supporting member.

Other objects and advantages of the present invention will become apparent during the following discussion, reference being had therein to the accompanying drawings, in which:

Figure 1 is a side elevation showing a brake assembly which incorporates the invention; and Figures 2, 3, 4 and 5 are sections taken on the lines 2—2, 3—3, 4—4, and 5—5, respectively, of Figure 1.

Referring to the figures, and particularly to Figure 2, a rotatable brake drum 12 having a cylindrical braking flange 14 is mounted on a flange 15 of the wheel hub 16. The wheel hub rotates on bearings 18 and 20 about the spindle 22. The improved brake construction is illustrated as applied to the front wheel of the vehicle, but it is equally usable as the rear wheel brake, or, for that matter, as a brake in any preferred location, and in any industrial or vehicular use.

In the illustrated wheel and axle arrangement, which is conventional, the spindle 22 is formed integral with the steering knuckle 24, through which extends the kingpin 26, which is rotatably mounted in the upper and lower forks 28 provided on the end of the axle.

The combined supporting plate and cover plate of the brake is a sheet metal plate-like member 30 having a substantially flat annular center portion 32 adapted to serve as the support for the anchoring and/or applying means of the brake, and having an integral axially offset cover portion 34 adapted to serve as a closure for the open side of the drum. The center portion 32 of the plate member 30 is located in the center plane of the brake, i. e. in the plane in which act the brake applying and anchoring forces, and said center portion 32 is secured by a plurality of bolts 36 to the flange 38 provided on the steering knuckle 24. If the brake is used on the rear wheel of a vehicle, the center portion 32 of the plate member 30 is secured to the axle housing, within which rotates the axle shaft. The cover portion 34 of plate member 30 terminates adjacent the edge of the brake drum flange 14, thereby providing a substantially closed chamber in which the working parts of the brake operate. This prevents dirt, water, oil, and other extraneous matter from interfering with the proper operation of the brake.

The working parts of the brake may consist of two T-section brake shoes 40 and 42, and two hydraulic actuators 44 and 46. Each of the brake shoes has a rim 48 provided with friction lining 50, and a strengthening web 52. As shown in Figure 2, the webs 52 of the shoes, which are located at the center of the shoe rims, are in the same plane as the center portion 32 of plate member 30. Although the center lines of the shoe webs are shown coincident with the center line of center portion 32, a slight offset is permissible without sacrificing to any appreciable degree the advantage of avoiding offset loading of the supporting plate.

The shoes 40 and 42 are supported and guided laterally both by having their rims 48 in engagement with ledges 54 provided on the cover portion 34 of plate member 30, and by means of hold-down devices 56 acting against the shoe webs approximately at the center thereof, said hold-down devices consisting of spring-metal fingers (see Figure 2) which are secured at one end to the center portion 32 of plate member 30 and have their other ends in engagement with the respective shoe webs. A plurality of the raised ledges 54 are provided, circumferentially spaced around the periphery of the brake assembly. Six such ledges are shown in Figure 1, three being associated with each shoe. In addition to the action of the hold-down devices 56 which urge the shoes into engagement with the ledges 54, further biasing action on the shoes is provided by the shoe return springs, in a manner hereinafter explained.

Preferably the hydraulic actuators 44 and 46 serve not only as means for applying the brake shoes to the drum, but also as means for transferring the anchoring torque of the shoes to the plate member 30. The hydraulic actuators may be formed as castings, each having a body portion 58 located radially outwardly beyond the periphery of the annular center portion 32 of the plate member 30. The body of each casting is provided with a cylindrical bore 60 which is so located that its longitudinal axis lies in the plane of the center portion 32 of plate member 30, as shown in Figure 3. Here again, as in the case of the brake shoes, although it is preferred that the axes of the cylinder bores lie in the exact axial center of the brake assembly, slight offsetting is permissible, without seriously impairing the advantage of avoiding offset loading of the supporting plate.

In order to secure the hydraulic actuator casings to the plate member 30, each casting is provided with a single integral laterally-offset radially inwardly extending flat flange 62 which engages the face of the center portion 32 of plate member 30, and which is secured thereto. Inasmuch as the shoes are arranged to anchor on the hydraulic actuators, the means for holding the actuators in place on the supporting plate must be sufficiently resistant to shear action to withstand the full torque of the shoes.

In order to provide an improved torque-absorbing arrangement, the flanges 62 of the hydraulic actuators, instead of being secured to the supporting plate solely by means of a plurality of bolts or screws, are each provided, as shown in Figure 4, with two depressions 64 which receive laterally-projecting torque-taking nibs 66 provided in the center portion 32 of plate member 30. Furthermore, each hydraulic actuator has a laterally extending integral boss 63 (see Figure 3) which extends through an opening 65 formed in the cover portion 34 of plate member 30. This arrangement has proved to be capable of withstanding much higher torque than the construction previously used. A single screw, or fastening member, 68 is used (see Figures 3 and 4) to retain the flange 62 of each actuator against the face of the supporting plate, the screws extending through holes in the plate and into threaded openings in the respective flanges.

The bosses 63 of the hydraulic actuators are intended to provide inlet and bleed passages for the bores of the actuators, but they also serve admirably as torque-resisting means in the brake structure. They are particularly desirable in this respect because they are substantially in line with the tangentially-acting anchoring force, and therefore are not required to resist the anchoring load under the disadvantage of an unfavorable leverage ratio. In other words, insofar as the bosses 63 are concerned, the anchoring force is not multiplied in effectiveness by a high leverage ratio due to the moment arm of the force about the axis of resistance.

Each boss 63 has a passage 67 therein, which intersects the bore 60 of the actuator. In the case of actuator 44, which is seen in Figure 3, passage 67 is closed by a bleed screw 69, whereas passage 67 of actuator 46 is connected to a conduit which leads to the conventional master cylinder.

Although the illustrated embodiment of the invention utilizes two hydraulic actuators, thereby providing a brake in which both shoes are self-energizing, the principles of the invention are also applicable to brakes in which only one actuator is used. Furthermore, where two actuators are used, they may be identical in construction, as shown, or they may differ, one having a single piston, and the other having two pistons.

In the illustrated brake, each actuator has only a single piston 70 reciprocable in its bore 60. Only the actuator 44 is shown in section, because the two units are identical in construction. The end of each actuator remote from its piston is closed, as shown, providing an anchor for the heel of one of the shoes. In this respect the construction and arrangement of the actuators and shoes corresponds to that disclosed and claimed in House application Serial No. 674,772, filed June 6, 1946, now Patent No. 2,595,143, issued April 29, 1952. The present brake also compares with that of application Serial No. 674,772 in respect to the arrangement of the adjusting screw 72, which is screwed into the outer end of the piston of each actuator, and against the outer end of which one end of one of the shoes bears. A spring member 74 carried by each piston has a yieldable arm 76 which retains the serrated head of the adjusting screw in the selected position, and a slotted arm 78 which embraces the shoe web, thereby preventing the piston from rotating.

When fluid under pressure is admitted to the interior of the actuators 44 and 46 through conduit 80 and through the conduit connected to the usual master cylinder, the pistons 70 are moved outwardly, forcing the shoes into engagement with the drum. The shoes anchor against the closed ends of the actuators and are both self-energizing during forward rotation of the wheels (which is indicated by the direction of the arrow F in Figure 1).

The principles of the present invention are equally applicable to a brake in which the actuators have two pistons each, in which case both shoes are self-energizing in both directions of rotation.

When the applying pressure is removed, the shoes are returned to their released positions by means of the return springs 82 and 84, which are connected in tension between the ends of the shoes at opposite sides of the brake, the ends of the springs being hooked over the projections 86 provided on the shoe webs.

In order to derive a lateral component of the return spring force holding the shoes in engagement with the ledges 54, the actuators 44 and 46 are provided with radially outwardly extending integral spring-guiding projections 88 which deflect the springs 82 and 84 centrally thereof (see Figure 5) to cause the springs to urge the shoes toward the ledges 54, as well as toward released position.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake, for use in cooperation with a rotatable drum, comprising a sheet metal plate-like member having a flat annular center portion adapted to serve as a support for the anchoring and applying means of the brake and having an integral axially offset cover portion adapted to serve as a closure for the open side of the drum, said center portion having at each of two substantially diametrically opposed locations an opening for a fastening member and two round torque-taking laterally projecting nibs, said cover portion having a plurality of circumferentially spaced shoe-guiding ledges near the periphery thereof, two hydraulic actuators, each having a body portion located radially outwardly beyond the periphery of the annular center portion of the plate-like member, the body portion of each actuator having a cylinder bore the axis of which lies in the plane of said center portion, each actuator having a single integral laterally-offset radially inwardly extending flat flange lying against the face of said center portion, each flange having two depressions into which fit the respective two torque-taking nibs, an axially extending fastening member extending into each flange and through the respective opening in the center portion of the plate-like member, at least one piston reciprocable in the cylinder bore of each actuator, each actuator having a radially outwardly extending integral spring-guiding projection, two T-section shoes, each having its web in the plane of the center portion of the plate-like member and each having one end of its rim lying against a plurality of the aforementioned ledges on the cover portion of the plate-like member, said shoes being operatively associated with the pistons in the respective hydraulic actuators, whereby outward movement of the pistons moves the shoes toward the drum, and anchoring torque of the shoes is transmitted through the hydraulic actuators to the center portion of the plate-like member, two return springs in tension between the ends of the shoes at opposite sides of the brake, said springs being laterally deflected by the spring-guiding projections of the respective actuators to derive a component holding the shoe rims against the guiding ledges, and shoe hold-down devices carried by the center portion of the plate-like member and engaging the shoes near the center thereof to assist in retaining them in the proper lateral position.

2. A brake, for use in cooperation with a rotatable drum, comprising a sheet metal supporting plate having at each of two substantially diametrically opposed locations an opening for a fastening member and two round torque-taking laterally projecting nibs, two hydraulic actuators, each having a body portion provided with a cylindrical bore having its axis in the plane of the supporting plate, each actuator having a single integral laterally-offset radially inwardly extending flat flange lying against the supporting plate, each flange having two openings into which fit the respective two torque-taking nibs, an axially extending fastening member extending into each flange and through the respective opening in the supporting plate, at least one piston reciprocable in the bore of each actuator, each actuator having a radially outwardly extending integral spring-guiding projection, two T-section shoes, each having its web in the plane of the supporting plate, said shoes being operatively associated with the pistons in the respective hydraulic actuators, whereby outward movement of the pistons moves the shoes toward the drum, and anchoring torque of the shoes is transmitted through the hydraulic actuators to the supporting plate, and two return springs in tension between the ends of the shoes at opposite sides of the brake, said springs being laterally deflected by the spring-guiding projections of the respective actuators.

3. A brake, for use in cooperation with a rotatable drum, comprising a sheet metal supporting plate having at each of two substantially diametrically opposed locations an opening for a fastening member and two torque-taking laterally projecting nibs, two hydraulic actuators, each having a body portion provided with a cylindrical bore having its axis in the plane of the supporting plate, each actuator having a single integral laterally-offset radially inwardly extending flat flange lying against the supporting plate, each flange having two depressions into which fit the respective two torque-taking nibs, an axially extending fastening member extending into each flange and through the respective opening in the supporting plate, at least one piston reciprocable in the bore of each actuator, and two T-section shoes, each having its web in the plane of the supporting plate, said shoes being operatively associated with the pistons in the respective hydraulic actuators, whereby outward movement of the pistons moves the shoes toward the drum, and anchoring torque of the shoes is transmitted through the hydraulic actuators to the supporting plate.

4. A brake, for use in cooperation with a rotatable drum, comprising a sheet metal supporting plate having an opening for a fastening member and two torque-taking laterally projecting nibs, a hydraulic actuator having a body portion provided with a cylindrical bore having its axis in the plane of the supporting plate, said actuator having a single integral laterally-offset radially inwardly extending flat flange lying against the supporting plate, said flange having two openings into which fit the two torque-taking nibs, an axially extending fastening member extending into the flange and through the opening in the supporting plate, a piston reciprocable in the bore of the actuator, and a T-section shoe having its web in the plane of the supporting plate, said shoe being operatively associated with the piston in the hydraulic actuator, whereby outward movement of the piston moves the shoe toward the drum, and anchoring torque of the shoe is transmitted through the hydraulic actuator to the supporting plate.

5. A brake, for use in cooperation with a rotatable drum, comprising a supporting plate having an opening for a fastening member and one or more torque-taking laterally projecting nibs, a hydraulic actuator having a body portion provided with a cylindrical bore and a radially inwardly extending flange lying against the supporting plate, said flange having one or more openings into which fit the torque-taking nib or nibs, the fit between said nibs and nib-openings being in the plane which includes the axis of said bore, an axially extending fastening member extending into the flange and through the opening in the supporting plate, a piston reciprocable in the bore of the actuator, and a shoe operatively associated with the piston in the hydraulic actuator, whereby outward movement of the piston moves the shoe toward the drum, and anchoring torque of the shoe is transmitted through the hydraulic actuator to the supporting plate.

6. A brake, for use in cooperation with a rotatable drum, comprising a supporting plate having one or more torque-taking laterally projecting nibs, a hydraulic actuator having a body portion provided with a cylindrical bore and a radially inwardly extending flange lying against the supporting plate, said flange having one or more openings into which fit the torque taking nib or nibs, the fit between said nibs and nib-openings being in the plane which includes the axis of said bore, and a fastening member which secures the flange to the supporting plate.

7. A brake, for use in cooperation with a rotatable drum, comprising a sheet metal plate-like member having a flat annular center portion adapted to serve as a support for the anchoring and applying means of the brake and having an integral axially offset cover portion adapted to serve as a closure for the open side of the drum, said cover portion having a plurality of circumferentially spaced shoe-guiding ledges near the periphery thereof, two hydraulic actuators, each having a body portion located radially outwardly beyond the periphery of the annular center portion of the plate-like member, the body portion of each actuator having a cylinder bore the axis of which lies in the plane of said center portion, each actuator having a single integral laterally-offset radially inwardly extending flat flange lying against the face of said center portion, means for securing said flange to said center portion of the plate-like member, at least one piston reciprocable in the cylinder bore of each actuator, each actuator having a radially outwardly extending integral spring-guiding projection, two T-section shoes, each having its web in the plane of the center portion of the plate-like member and each having one edge of its rim lying against a plurality of the aforementioned ledges on the cover portion of the plate-like member, said shoes being operatively associated with the pistons in the respective hydraulic actuators, whereby outward movement of the pistons moves the shoes toward the drum, and anchoring torque of the shoes is transmitted through the hydraulic actuator to the center portion of the plate-like member, two return springs in tension between the ends of the shoes at opposite sides of the brake, said springs being laterally deflected by the spring-guiding projections of the respective actuators to derive a component holding the shoe rims against the guiding ledges, and shoe hold-down devices carried by the center portion of the plate-like member and engaging the shoes near the center thereof to assist in retaining them in the proper lateral position.

8. A brake, for use in cooperation with a rotatable drum, comprising a sheet metal plate-like member having a flat annular center portion adapted to serve as a support for the anchoring and applying means of the brake and having an integral axially offset cover portion adapted to serve as a closure for the open side of the drum, said cover portion having a plurality of circumferentially spaced shoe guiding ledges near the periphery thereof, two hydraulic actuators, each having a body portion located radially outwardly beyond the periphery of the annular center portion of the plate-like member, the body portion of each actuator having a cylinder bore of which lies in the plane of said center portion, each actuator having a single integral laterally-offset radially inwardly extending flat flange lying against the face of said center portion, means for securing said flange to said center portion of the plate-like member, at least one piston reciprocable in the cylinder bore of each actuator, each actuator having a radially outwardly extending integral spring-guiding projection, two T-section shoes, each having its web in the plane of the center portion of the plate-like member and each having one edge of its rim lying against a plurality of the aforementioned ledges on the cover portion of the plate-like member, said shoes being operatively associated with the pistons in the respective hydraulic actuators, whereby outward movement of the pistons moves the shoes toward the drum, and anchoring torque of the shoes is transmitted through the hydraulic actuators to the center portion of the plate-like member, and two return springs in tension between the ends of the shoes at opposite sides of the brake, said springs being laterally deflected by the spring-guiding projections of the respective actuators to derive a component holding the shoe rims against the guiding ledges.

9. A brake, for use in cooperation with a rotatable drum, comprising a sheet metal plate-like member having a flat annular center portion adapted to serve as a support for the anchoring and applying means of the brake and having an integral axially offset cover portion adapted to serve as a closure for the open side of the drum, said cover portion having a plurality of circumferentially spaced shoe-guiding ledges near the periphery thereof, two hydraulic actuators, each having a body portion located radially outwardly beyond the periphery of the annular center portion of the plate-like member, the body portion of each actuator having a cylinder bore the axis of which lies in the plane of said center portion, each actuator having a single integral laterally-offset radially inwardly extending flat flange lying against the face of said center portion, means for securing said flange to said center portion of the plate-like member, at least one piston reciprocable in the cylinder bore of each actuator, and two T-section shoes, each having its web in the plane of the center portion of the plate-like member and each having one edge of its rim lying against a plurality of the aforementioned ledges on the cover portion of the plate-like member, said shoes being operatively associated with the pistons in the respective hydraulic actuators, whereby outward movement of the pistons moves the shoes toward the drum, and anchoring torque of the shoes is transmitted through the hydraulic actuators to the center portion of the plate-like member.

10. A brake, for use in cooperation with a rotatable drum, comprising a combined support-and-cover-plate member having a substantially flat annular center portion adapted to serve as a support for the anchoring and applying means of the brake and having an integral axially offset cover portion adapted to serve as a closure for the open side of the drum, said cover portion having one or more circumferentially spaced shoe-guiding ledges near the periphery thereof, a hydraulic actuator having a body portion located radially outwardly beyond the periphery of the annular center portion of the plate member, the body portion of said actuator having a cylinder bore the axis of which lies in the plane of said center portion, said actuator having a single integral laterally-offset radially inwardly extending flat flange lying against the face of said center portion, means for securing said flange to said center portion of the plate member, at least one piston reciprocable in the cylinder bore of the actuator, and a T-section shoe having its web in the plane of the center portion of the plate member and having one edge of its rim lying against the aforementioned ledge or ledges on the cover portion of the plate member, said shoe being operatively associated with the piston in the hydraulic actuator, whereby outward movement of the piston moves the shoe toward the drum, and anchoring torque of the shoe is transmitted through the hydraulic actuator to the center portion of the plate member.

11. A brake, for use in cooperation with a rotatable drum, comprising a combined support-and-cover-plate member having a substantially flat center portion adapted to serve as a support for the anchoring and/or applying means of the brake and having an integral axially offset cover portion adapted to serve as a closure for the open side of the drum, a hydraulic actuator having a body portion located radially outwardly beyond the periphery of the center portion of the plate member, the body portion of said actuator having a cylinder bore the axis of which lies in substantially the plane of said center portion, said actuator having a laterally-offset radially inwardly extending flange lying against the face of said center portion, means for securing said flange to said center portion of the plate member, at least one piston reciprocable in the cylinder bore of the actuator, and a T-section shoe having its web in substantially the plane of the center portion of the plate member, said shoe being operatively associated with the piston in the hydraulic actuator, whereby outward movement of the piston moves the shoe toward the drum, and anchoring torque of the shoe is transmitted through the hydraulic actuator to the center portion of the plate member.

12. A brake, for use in cooperation with a rotatable drum, comprising a combined-support-and-cover-plate member having a substantially flat center portion adapted to serve as a support for the anchoring and/or applying means of the brake and having an integral axially offset cover portion adapted to serve as a closure for the open side of the drum, a hydraulic actuator having a body portion located radially outwardly beyond the periphery of the center portion of the plate member, the body portion of said actuator having a cylinder bore the axis of which lies in substantially the plane of said center portion, said actuator having an inwardly extending flange lying against the face of said center portion, means for securing said flange to said center portion of the plate member, at least one piston reciprocable in the cylinder bore of the actuator, and a shoe operatively associated with the piston in the hydraulic actuator.

13. A brake, for use in cooperation with a rotatable drum, comprising a sheet metal plate-like member having a flat annular center portion adapted to serve as a support for the anchoring and applying means of the brake and having an integral axially offset cover portion adapted to serve as a closure for the open side of the drum, said center portion having at each of two substantially diametrically opposed locations an opening for a fastening member and two torque-taking laterally projecting nibs, said cover portion having a plurality of circumferentially spaced shoe-guiding ledges near the periphery thereof and having at each of two substantially diametrically opposed locations an opening for an actuator boss, two hydraulic actuators, each having a body portion located radially outwardly beyond the periphery of the annular center portion of the plate-like member, the body portion of each actuator having a cylinder bore the axis of which lies in the plane of said center portion, each actuator having a single integral laterally-offset radially inwardly extending flat flange lying against the face of said center portion, each flange having two depressions into which fit the respective two torque-taking nibs, an axially extending fastening member extending through each flange and through the respective opening in the center portion of the plate-like member, each actuator having a laterally extending torque-taking boss which extends through the respective opening in the cover portion of the plate-like member and in which is formed a fluid passage which intersects the bore of the actuator, at least one piston reciprocable in the cylinder bore of each actuator, each actuator having a radially outwardly extending integral spring-guiding projection, two T-section shoes, each having its web in the plane of the center portion of the plate-like member and each having one edge of its rim lying against a plurality of the aforementioned ledges on the cover portion of the plate-like member, said shoes being operatively associated with the pistons in the respective hydraulic actuators, whereby outward movement of the pistons moves the shoes toward the drum, and anchoring torque of the shoes is transmitted through the hydraulic actuators to the plate-like member, two return springs in tension between the ends of the shoes at opposite sides of the brake, said springs being laterally deflected by the spring-guiding projections of the respective actuators to derive a component holding the shoe rims against the guiding ledges, and shoe hold-down devices carried by the center portion of the plate-like member and engaging the shoes near the center thereof to assist in retaining them in the proper lateral position.

14. A brake, for use in cooperation with a rotatable drum, comprising a sheet metal supporting plate having at each of two substantially diametrically opposed locations an opening for an actuator boss and two torque-taking laterally projecting nibs, two hydraulic actuators, each having a body portion provided with a cylindrical bore having its axis in the plane of the supporting plate, each actuator having a single integral laterally-offset radially inwardly extending flat flange lying against the supporting plate, each flange having two depressions into which fit the respective two torque-taking nibs, an axially extending fastening member extending through each flange to secure the same to the supporting plate, each actuator having a laterally extending torque-taking boss which extends through the respective opening in the supporting plate and in which is formed a fluid passage which intersects the bore of the actuator, at least one piston reciprocable in the bore of each actuator, each actuator having a radially outwardly extending integral spring-guiding projection, two T-section shoes, each having its web in the plane of the supporting plate, said shoes being operatively associated with the pistons in the respective hydraulic actuators, whereby outward movement of the pistons moves the shoes toward the drum, and anchoring torque of the shoes is transmitted through the hydraulic actuators to the supporting plate, and two return springs in tension between the ends of the shoes at opposite side of the brake, said springs being laterally deflected by the spring-guiding projections of the respective actuators.

15. A brake, for use in cooperation with a rotatable drum comprising a sheet metal supporting plate having at each of two substantially diametrically opposed locations an opening for an actuator boss and two round torque-taking laterally projecting nibs, two hydraulic actuators, each having a body portion provided with a cylindrical bore having its axis in the plane of the supporting plate, each actuator having a single integral laterally-offset radially inwardly extending flat flange lying against the supporting plate, each flange having two depressions into which fit the respective two torque-taking nibs, an axially extending fastening member extending through each flange to secure the same to the supporting plate, each actuator having a torque-taking boss which extends through the respective opening in the supporting plate and in which is formed a fluid passage, at least one piston reciprocable in the bore of each actuator, and two T-section shoes, each having its web in the plane of the supporting plate, said shoes being operatively associated with the pistons in the respective hydraulic actuators, whereby outward movement of the pistons moves the shoes toward the drum, and anchoring torque of the shoes is transmitted through the hydraulic actuators to the supporting plate.

16. A brake, for use in cooperation with a rotatable drum, comprising a sheet metal supporting plate having an opening for an actuator boss and one or more torque-taking laterally projecting nibs, a hydraulic actuator having a body portion provided with a cylindrical bore having its axis in the plane of the supporting plate, said actuator having a single integral laterally-offset radially inwardly extending flat flange lying against the supporting plate, said flange having one or more depressions into which fit the torque-taking nib or nibs, an axially extending fastening member extending through the flange to secure the same to the supporting plate, said actuator having a torque-taking boss which extends through the opening in the supporting plate and in which is formed a fluid passage, a piston reciprocable in the bore of the actuator, and a T-section shoe having its web in the plane of the supporting plate, said shoe being operatively associated with the piston in the hydraulic actuator, whereby outward movement of the piston moves the shoe toward the drum, and anchoring torque of the shoe is transmitted through the hydraulic actuator to the supporting plate.

17. A brake, for use in cooperation with a rotatable drum, comprising a supporting plate having an opening for an actuator boss and one or more round torque-taking laterally projecting nibs, a hydraulic actuator having a body portion provided with a cylindrical bore and a radially inwardly extending flange lying against the supporting plate, said flange having one or more depressions into which fit the torque-taking nib or nibs, the fit between said nibs and depressions being in the plane which includes the axis of said bore, an axially extending fastening member extending through the flange to secure the same to the supporting plate, said actuator having a torque-taking boss which extends through the opening in the supporting plate and in which is formed a fluid passage, a piston reciprocable in the bore of the actuator, and a shoe operatively associated with the piston in the hydraulic actuator, whereby outward movement of the piston moves the shoe toward the drum, and anchoring torque of the shoe is transmitted through the hydraulic actuator to the supporting plate.

18. A brake, for use in cooperation with a rotatable drum, comprising a combined-support-and-cover-plate member having a substantially flat center portion adapted to serve as a support for the anchoring and/or applying means of the brake and having an integral axially offset cover portion adapted to serve as a closure for the open side of the drum, said cover portion having an opening formed therethrough to accommodate an actuator boss, a hydraulic actuator having a body portion located radially outwardly beyond the periphery of the center portion of the plate member, the body portion of said actuator having a cylinder bore the axis of which lies in substantially the plane of said center portion and having a lateral boss extending through the opening in the cover portion and provided with a fluid passage, said actuator having an inwardly extending flange lying against the face of said center portion, means for securing said flange to said center portion of the plate member, at least one piston reciprocable in the cylinder bore of the actuator, and a shoe operatively associated with the piston in the hydraulic actuator.

19. A brake, for use in cooperation with a rotatable drum, comprising a combined support-and-cover-plate member having a substantially flat center portion adapted to serve as a support for the anchoring means of the brake and having an integral axially offset cover portion adapted to serve as a closure for the open side of the drum, an anchor member having a shoe-engaging portion located radially outwardly beyond the periphery of the center portion of the plate member and having a radially inwardly extending flange lying against the face of said center portion, means for securing said flange to said center portion of the plate member, and a T-section shoe having its web in substantially the plane of the center portion of the plate member and having anchoring engagement with the shoe-engaging position of the anchor member.

20. A brake, for use in cooperation with a rotatable drum, comprising a combined support-and-cover-plate member having a substantially flat center portion adapted to serve as a support for the anchoring and/or applying means of the brake and having an integral axially offset cover portion adapted to serve as a closure for the open side of the drum, a hydraulic actuator having a body portion located radially outwardly beyond the periphery of the center portion of the plate member, the body portion of said actuator having a cylinder bore formed therein, said actuator having a radially inwardly extending flange lying against the face of said center portion, means for securing said flange to said center portion of the plate member, at least one piston reciprocable in the cylinder bore of the actuator, and a shoe operatively associated with the piston in the hydraulic actuator, whereby outward movement of the piston moves the shoe toward the drum, and anchoring torque of the shoe is transmitted through the hydraulic actuator to the center portion of the plate member.

21. A brake, for use in cooperation with a rotatable drum, comprising a combined support-and-cover-plate member having a substantially flat center portion adapted to serve as a support for the anchoring and/or applying means of the brake and having an integral axially offset cover portion adapted to serve as a closure for the open side of the drum, said cover portion having an opening therein adapted to receive an actuator boss, a hydraulic actuator having a body portion located radially outwardly beyond the periphery of the center portion of the plate member, the body portion of said actuator having a cylinder bore formed therein and a laterally projecting torque-taking boss which extends through the opening in the cover portion, said boss having a fluid passage extending therethrough, said actuator having a radially inwardly extending flange lying against the face of the center portion of the plate member, means for securing said flange to said center portion, at least one piston reciprocable in the cylinder bore of the actuator, and a shoe operatively associated with the piston in the hydraulic actuator, whereby outward movement of the piston moves the shoe toward the drum, and anchoring torque of the shoe is transmitted through the hydraulic actuator to the support-and-cover-plate member.

22. A brake, for use in cooperation with a rotatable drum, comprising a combined support-and-cover-plate member having a substantially flat center portion adapted to serve as a support for the anchoring and/or applying means of the brake and having an integral axially offset cover portion adapted to serve as a closure for the open side of the drum, said cover portion having an opening therein adapted to receive an actuator boss, a hydraulic actuator having a body portion located radially outwardly beyond the periphery of the center portion of the plate member, the body portion of said actuator having a torque-taking boss formed thereon which projects through the opening in the cover portion, said boss providing a fluid passage, said actuator having a radially inwardly extending flange lying against the face of the center portion of the plate member, means for securing said flange to said center portion, and a shoe operatively associated with the hydraulic actuator in such a way that anchoring torque of the shoe is transmitted through the hydraulic actuator to the support-and-cover-plate member.

BRYAN E. HOUSE.

References Cited in the file of this patent

UNITED STATES PATENTS

| Number | Name | Date |
|---|---|---|
| 1,835,763 | Dick | Dec. 8, 1931 |
| 1,875,374 | Gallup | Sept. 6, 1932 |
| 2,046,140 | White | June 30, 1936 |
| 2,303,699 | Main | Dec. 1, 1942 |
| 2,336,352 | Goepfrich | Dec. 7, 1943 |
| 2,347,599 | Forbes | Apr. 25, 1944 |
| 2,406,754 | Forbes | Sept. 3, 1946 |
| 2,475,492 | Goepfrich et al. | July 5, 1949 |